Figure 1:
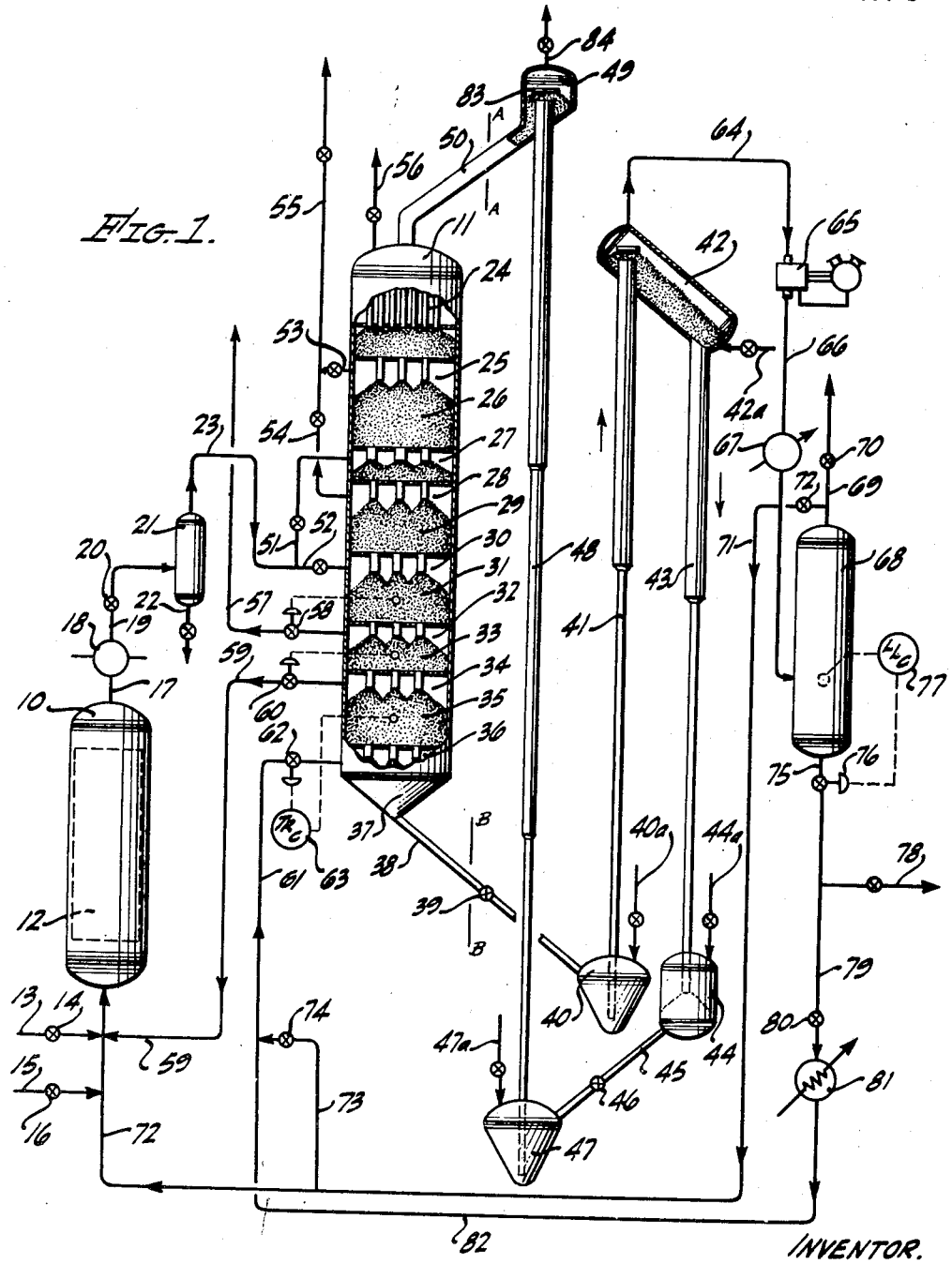

July 27, 1954  C. H. O. BERG  2,684,967
PROCESS FOR MANUFACTURE OF OLEFIN OXIDES
Filed March 19, 1953  2 Sheets-Sheet 1

INVENTOR.
CLYDE H.O. BERG
BY
AGENT.

July 27, 1954

C. H. O. BERG 2,684,967

PROCESS FOR MANUFACTURE OF OLEFIN OXIDES

Filed March 19, 1953

2 Sheets-Sheet 2

INVENTOR.
CLYDE H. O. BERG
BY
AGENT.

Patented July 27, 1954

2,684,967

UNITED STATES PATENT OFFICE 2,684,967

PROCESS FOR MANUFACTURE OF OLEFIN OXIDES

Clyde H. O. Berg, Long Beach, Calif., assignor to Union Oil Company of California, Los Angeles, Calif., a corporation of California Application March 19, 1953, Serial No. 343,300

14 Claims. (Cl. 260—348.5)

This invention relates to improvements in processes involving the continuous contacting of fluids with moving streams of granular solids. In particular it relates to improved methods and apparatuses for treating a circulating stream of granular solids under conditions which include treatments at two substantially different pressures. Specifically one modification of this invention relates to a method and apparatus for the adsorption of gaseous mixtures on a moving bed of granular adsorbent and subsequently removing the adsorbed constituents at a reduced pressure.

This application is a continuation-in-part of my copending application, Serial Number 275,635, filed March 8, 1952, now abandoned, which in turn is a division of my copending application, Serial Number 144,677, filed February 17, 1950.

In the process of continuous selective adsorption of gaseous mixtures on a solid granular adsorbent, the gaseous mixture is contacted under countercurrent conditions of flow with a moving bed of solid granular adsorbent. The more readily adsorbable constituents of the gaseous mixture are adsorbed leaving the less readily adsorbable constituents as a substantially unadsorbed lean gas which is removed from the process as a product stream. Under the usual conditions of operation the rich adsorbent is indirectly heated and contacted with the stripping gas whereby the adsorbed constituents are removed leaving a lean adsorbent. A portion of the thus desorbed constituents is used as reflux to rectify the rich adsorbent and to preferentially desorb any residual quantities of the less readily adsorbable constituents usually present. These more readily adsorbable constituents thus desorbed are all eventually removed as a rich gas product.

Certain gaseous mixtures desirably separated by the continuous selective adsorption process contain more readily adsorbable constituents which are deleteriously affected by the conditions of stripping; for example, highly unsaturated hydrocarbons are prone to polymerize under such conditions resulting in a decreased adsorbent capacity for adsorption as well as a serious loss of a desirable product. Other gaseous mixtures are deleteriously affected by the presence of the stripping gas which is usually steam.

The usual stripping treatment involves heating the adsorbent to temperatures of between about 200° F. and 600° F. and contacting the heated adsorbent directly with a stripping gas, usually steam. When the rich adsorbent so treated contains adsorbed polymerizable materials such as olefin hydrocarbons, diolefin hydrocarbons such as cyclopentadiene, butadiene and the like, acetylene and substituted homologues of acetylene, and especially the olefin oxides such as ethylene oxide and propylene oxide and other well-known polymerizable organic monomers having 5 carbon atoms per molecule and less, the stripping temperatures sometimes cause polymerization of these adsorbed materials which results in adsorbent deactivation and a decrease in adsorbed product yield. When the rich adsorbent contains adsorbed gases which are corrosive in the presence of moisture such as the halogens, chlorine and bromine, or the halogen acids, hydrogen fluoride, hydrogen chloride, hydrogen bromide or hydrogen iodide or such acidic gases as hydrogen cyanide, sulfur dioxide, sulfur trioxide or mixtures thereof, a corrosion problem is presented in stripping the rich adsorbent with steam. In addition, it is difficult to separate these desorbed rich gases from the stripping steam by usual cooling and partial condensation because of the solubility of these gases in water. The olefin oxides mentioned above are very soluble in water and also polymerize and react with water quite readily to form polymers and hydrated hydrocarbon products such as the corresponding glycols, etc.

It is therefore an object of the present invention to provide an improvement in the selective adsorption process whereby such gaseous mixtures may be separated and the adsorbed constituents removed from the adsorbent by a low pressure treatment in the presence of a non-reactive stripping gas.

In the continuous processes for the catalytic treatment of fluids, which may be exemplified by the catalytic cracking of hydrocarbons, a spent carbonaceous catalyst containing residual hydrocarbons desirably recovered is discharged from the reaction zone. In the usual manner of treatment these hydrocarbons are removed from the catalyst by steam stripping. It has been shown, however, that steam has a deleterious effect upon cracking catalysts and the loss of activity thereof is tolerated since more intricate means for treating the catalyst is not warranted.

Other catalytic processes such as for example the well-known hydroforming process involve a series of treating operations in which the catalyst is successively contacted with hydrocarbons to be reformed, a purge gas, an oxygen-containing regeneration gas, another purge gas followed by a hydrogen-containing reducing gas and another purge gas. Such processes as this one also involve the removal of fluids from solids, an operation which is more conveniently carried out by a low pressure or vacuum treatment.

It is therefore another object of the present invention to provide an improved process and apparatus for the alternate high pressure and low pressure treatment of solids in continuous moving bed catalyst processes.

The primary object of the present invention is to provide an improved method and apparatus for processing a continuous recirculating solids stream under conditions involving separate steps at substantially different pressures.

A further object is to provide an improved process and apparatus for contacting solids with high pressure fluids and low pressure fluids in the same system, economically, efficiently and in simple mechanical steps.

It is another object of this invention to provide an improved continuous selective adsorption process involving a low pressure stripping step.

A more specific object is to provide an improved process for catalytic oxidation of ethylene and the separation of ethylene oxide in a selective adsorption process utilizing low pressure stripping.

It is also an object to provide a simplified apparatus to accomplish the above-mentioned objects.

Other objects and advantages of the present invention will become apparent to those skilled in the art as the description thereof proceeds.

Briefly the present invention comprises an improvement in moving solids contact processes whereby a combination of solids conveyance conduits or lift lines and solids sealing legs or downcomers are operated through which the granular solids are moved in substantially compact form in the presence of a cocurrently or countercurrently depressuring fluid whereby the efficient movement of granular solids successively through zones of widely differing pressures is obtained. For example, the granular solids after contact with fluids at elevated pressures are depressured cocurrently with conveyance fluids through a conveyance zone to as low a pressure as desired in a subsequent treating zone which may be as low as the best commercially feasible vacuum pressures. Through these conveyance zones the solids are maintained in compact form, that is, at the same bulk density in pounds of solids per cubic foot of volume as the static bulk density of the solids when at rest. If a low pressure treatment is desirable the solids may be discharged into a vessel maintained at that pressure and through which treating fluids are passed. In some operations the low pressure treatment is conveniently effected in the conveyance zone while the solids are being removed from the high pressure zone to a low pressure zone. As an example of this latter modification, the stripping of residual fluids from granular solids in the presence of a stripping-conveyance fluid may be cited. From the low pressure zone the solids are allowed to pass by gravity through a sealing leg zone or downcomer through which the solids are carried by gravity countercurrently to a depressuring fluid flow whereby the solids are returned to a higher pressure zone. From this point the solids may be introduced, if desired, directly into the high pressure system or may be conveyed through another conveyance zone to the top, for example, of a vessel or zone operated at a higher pressure.

Thus a complete circulation of granular solids through zones of high and low pressure may be maintained under conditions in which the granular solids are always maintained in substantially compact form and are not aerated or fluidized or allowed to form suspensions of solids in fluids at any point in the depressuring or repressuring system.

It is to be understood, however, that in the high or low pressure system wherein the solids are contacted with the fluids to be treated, fluidized system may exist, but the successful operation of the step of depressuring the solids to a low pressure and repressuring them to the high pressure of the treating system requires that the solids are maintained in compact form in the conveyance and sealing leg zones.

The essence therefore of the present invention lies in the conveyance of compact granular solids through a conveyance zone cocurrently with a depressuring conveyance fluid, discharging the solids into a low pressure zone from the conveyance zone, flowing the solids by gravity from the low pressure zone through a sealing leg zone to a higher pressure zone, and returning the solids discharging from the sealing leg zone to a higher pressure treating zone for recirculation therethrough. It is to be understood that the general operation of this invention is applicable with advantage to virtually any process involving a circulating stream of solids which are moved through zones of differing pressures. The advantages realized in any of these processes include a substantial decrease in the amount of energy required to transport the solids as well as a substantial decrease in the solids losses due to attrition and abrasion. The decrease in attrition loss of solids is mainly attributed to the fact that there are no moving mechanical parts involved in conveying the solids.

Figure 2:
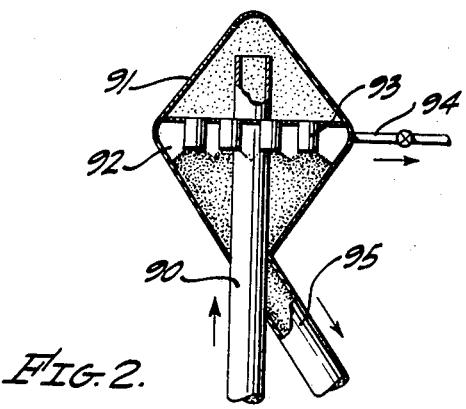

The process and apparatus of the present invention will be more clearly understood by reference to the accompanying drawings in which:

Figure 1 is a combination elevation view and process flow sheet for a continuous selective adsorption system for the separation of gaseous mixtures at an elevated pressure and the subsequent low pressure stripping of sensitive constituents of the gaseous mixture from the adsorbent, Figure 2 shows an elevation view in cross section of a portion of the conveyance apparatus by means of which the conveyance fluids and the conveyed solids are separated subsequent to conveyance.

Figure 3:
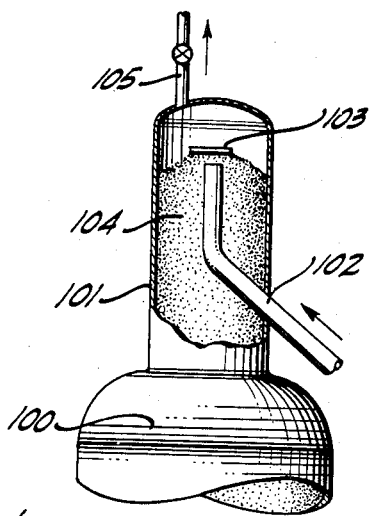
Figure 5:
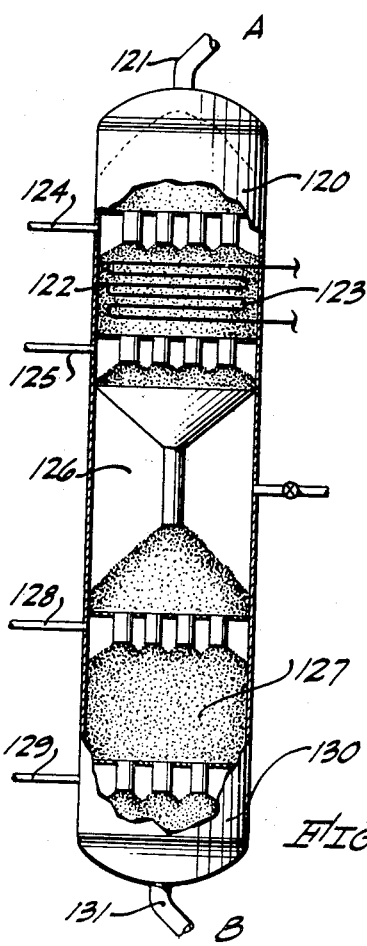
Figure 4:
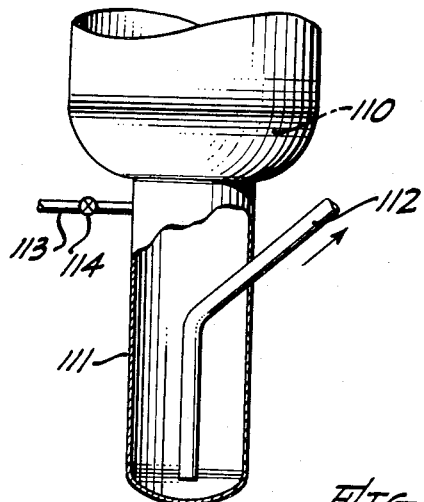

Figure 3 shows a modification of the conveyance fluid-solids separation device as it exists integrally with the upper portion of a treating vessel through which the solids are to be passed, Figure 4 shows an elevation view in cross section of a modification of the lower extremity of a vessel from which the solids are to be removed and conveyed according to this invention, and Figure 5 shows an elevation view in cross section of a vessel typical of catalytic treating processes and which may be substituted for the vessel in Figure 1.

Referring now more particularly to Figure 1, the description will be made of a typical selective adsorption process for the manufacture and recovery of ethylene oxide from the effluent gases of a catalytic ethylene oxidation reaction. In this process, catalytic reactor 10 and selective adsorption column 11 are provided to accomplish, respectively, the manufacture and the recovery of ethylene oxide. A silver catalyst 12 is employed in reactor 10 to contact the inlet gaseous mixture consisting primarily of fresh and recycle ethylene and air. Air is introduced via line 13 controlled by valve 14 and fresh ethylene introduced by line 15 controlled by valve 16 together with recycle ethylene recovered from the effluent gases. A reaction is effected at a temperature of which may be controlled between 350° F. and 750° F. The effluent gases contain nitrogen, unreacted oxygen, carbon monoxide, carbon dioxide, unreacted ethylene, ethylene oxide, and water vapor. These gases are removed from reactor 10 via line 17 and pass through heat interchanger 18 whereby the products are cooled and if desired the reactor feed gases may be preheated in this exchanger. The thus cooled gases subsequently pass via line 19 at a rate controlled by valve 20 into vapor-liquid separator 21 from which the condensate formed is removed via line 22 leaving a cooled ethylene oxide-containing gas. This gas comprises the feed gas to selective adsorption column 11 to which it is passed via line 23.

Selective adsorption column 11 is provided at successively lower levels therein with adsorbent cooling zone 24, first lean gas disengaging zone 25, first adsorption zone 26, first feed gas engaging zone 27, second lean gas disengaging zone 28, second lean gas adsorption zone 29, second feed gas engaging zone 30, first rectification zone 31, first side cut gas disengaging zone 32, second rectification zone 33, second side cut gas disengaging zone 34, third rectification zone 35, and reflux gas engaging zone 36. Solid adsorbent collecting in bottom zone 37 is conveyed via transfer line 38 controlled by valve 39 into first induction zone 40. The adsorbent is then depressured through conveyance zone 41 in substantially compact form into low pressure zone 42. Herein they may be contacted by a low pressure treating or stripping gas introduced by line 42a, but usually the conveyance gas or sealing gas is sufficient in quantity. The solids then flow by gravity through sealing leg 43 into sealing gas introduction zone 44. From here the solid adsorbent flows by gravity through transfer line 45 at a rate controlled by valve 46 into second induction zone 47. Valve element 46 for controlling solids flow preferably comprises a solids pressuring feeder for introducing solids into a higher pressure zone without substantial reverse flow of fluid. The various improved types of star valve solids feeders commercially available are suitable. From here the solids are then conveyed through second conveyance zone 48 into solids-conveyance fluid separator zone 49. The solids thus conveyed subsequently flow via transfer line 50 and are returned for circulation through selective adsorption column 11. Those items of equipment designated by the numbers 38 through 50 include the essential elements of the solids conveyance apparatus which permits the depressuring and repressuring of granular solids from a high pressure zone to a low pressure zone and from the low pressure zone back to the same or a different high pressure zone.

In the selective adsorption column 11, two adsorption zones are shown, namely, sections 26 and 29. A plurality of adsorption zones such as two or more and up to as many as six or eight are desirable in processing gaseous mixtures which contain relatively low percentages, such as less than about 10% by volume, of constituents to be adsorbed by the adsorbent. Thus the feed gas is divided into a plurality of streams each of which is passed separately through an individual adsorption zone. The effect of this is to reduce substantially the diameter of the column required to treat a given volume of gases. To prevent feed gas from passing from one engaging zone to the lean gas disengaging zone adjacent below, the depending tubes from the transverse plates which form the engaging and disengaging zone in column 11 are made in different diameters, that is, the depending tubes from the lean gas disengaging zones are substantially smaller in diameter than the depending tubes in the feed gas engaging zone. Thus the pressure drop of gas flowing downwardly from a feed gas engaging zone through the tubes of the next lower lean gas disengaging zone is substantially greater than the pressure drop of gas flow from the feed gas engaging zone through the next higher adsorption zone. In Figure 1, one continuous stream of adsorbent passes successively down through all of the plurality of adsorption zones.

It is to be understood, however, that a preferred modification exists in which the adsorbent leaving cooling zone 24 is divided into a plurality of separate streams, one each of which is separately introduced into each of the plurality of adsorption zones, and the individual streams are separately removed from the plurality of adsorption zones and combined for introduction into first rectification zone 31.

The effluent gaseous mixture from separator 21 is divided into two streams, one passing via line 51 into first adsorption zone 26 and the second via line 52 into second adsorption zone 29. The carbon dioxide, ethylene and ethylene oxide, together with traces of water vapor, if present, are adsorbed forming a rich adsorbent and the nitrogen, carbon monoxide, and unreacted oxygen remain unadsorbed as a lean gas. This lean gas is removed from lean gas disengaging zones 25 and 28 by means of lines 53 and 54, respectively, and are sent to storage or further processing facilities not shown via line 55. At least a portion of this lean gas is allowed to pass upwardly from disengaging zone 25 through the tubes of cooler 24 countercurrent to the down flowing adsorbent whereby the adsorbent is saturated with constituents of the lean gas product and traces of more readily adsorbable constituents are stripped therefrom. This gas is removed from the upper portion of column 11 via line 56.

The rich absorbent passes into first rectification zone 31 wherein it contacts a reflux stream of carbon dioxide thereby desorbing traces of nitrogen, carbon monoxide and unreacted oxygen from the adsorbent forming a first rectified adsorbent. This adsorbent passes into second rectification zone 33 wherein it is contacted by a countercurrent flow of ethylene reflux thereby preferentially desorbing carbon dioxide leaving a second rectified adsorbent. The thus desorbed carbon dioxide is partly employed as reflux in first rectification zone 31 and the remainder is removed via line 57 as a first side cut gas product controlled by valve 58 and is sent to further processing facilities or storage not shown. In third rectification zone 35 the adsorbent is contacted with a countercurrent flow of ethylene oxide reflux introduced via line 61 at a rate controlled by valve 62 in accordance with temperature recorder controller 63 whereby ethylene is preferentially desorbed from the adsorbent leaving a third rectified adsorbent. The thus desorbed ethylene is partly employed as reflux in zone 33 while the remainder is removed via line 59 at a rate controlled by valve 60 as a second side cut gas product. Preferably this recovered ethylene is returned via line 59 and recirculated through reactor 12 for further conversion.

The third rectified adsorbent is saturated with ethylene oxide and substantially free from less readily adsorbable constituents.

The rich absorbent then passes via transfer line 38 at a rate controlled by valve 39 into first induction zone 40. The adsorbent is then depressured with a cocurrent flow of ethylene oxide or a portion of the lean gas product or a separate inert gas introduced via line 40a as a lifting fluid. The solids pass upwardly through conveyance zone 41 with a cocurrent flow of a conveyance-stripping gas which depressures therethrough to any predetermined desired low pressure in vessel 42. During this conveyance a substantial proportion of the adsorbed ethylene oxide is desorbed from the adsorbent and the desorbed gases and the conveyed adsorbent are separated in vessel 42. The adsorbent subsequently flows downwardly through sealing leg 43 countercurrent to a flow of depressuring ethylene or a portion of the lean gas product or an inert gas introduced via line 44a as a sealing gas whereby further low pressure countercurrent stripping is effected. This gas is depressured upwardly through sealing leg 43 into vessel 42. The gases thus separated from the adsorbent therein are removed from vessel 42 via line 64. The predetermined low pressure is maintained by vacuum pump 65 or any similar device such as a jet ejector or a barometric leg. These gases contain stripped ethylene oxide together with the stripping and sealing gases. Preferably the lifting gas in conveyance zone 41, when ethylene oxide is not employed, is the same gas that is employed for sealing in sealing leg zone 43 since it considerably simplifies the problem of subsequent separation. These gases are then passed via line 66 through cooler 67 wherein ethylene oxide is condensed under pressure and the mixture passes to vapor liquid separator 68 wherein condensed ethylene oxide is separated from the noncondensable lift and sealing gases. When an inert gas or a portion of the lean gas is employed for lifting and/or sealing in zones 41 and 43 the noncondensable gases are removed from separator 68 via line 69 at a rate controlled by valve 70 and may be discharged from the process or recirculated to the feed gas to recover residual traces of ethylene oxide. When ethylene and/or ethylene oxide are used for lifting and ethylene is used for sealing, the noncondensable gases are removed from separator 68 via line 71 at a rate controlled by valve 72 and are recirculated in one of two ways. First, the ethylene may be conveyed via line 71 and line 72 for recirculation and reconversion in reactor 12, or second, it may be at least partially passed via line 73 controlled by valve 74 and through line 61 as reflux to selective adsorption column 11. In the latter instance the ethylene oxide condensed in separator 68 is removed therefrom via line 75 at a rate controlled by valve 76 by liquid level controller 77 and is removed from the system as a liquid product via line 78. Preferably, however, at least a portion of the ethylene oxide product passes via line 79 controlled by valve 80 through vaporizer 81 and lines 82 and 61 as reflux to the third rectification zone of the selective adsorption column. This is the preferred form of reflux in that rectification zone.

The stripped adsorbent collecting in sealing gas inlet zone 44 flows by gravity into second induction zone 47 into which a lifting fluid such as an inert gas or preferably a portion of the lean gas product is introduced via line 41a. The stripped solids are depressured upwardly through conveyance zone or lift line conduit 48 in substantially compact form as a continuous upward moving bed cocurrently with the depressing lifting fluid. The lifting fluid and the conveyed adsorbent are discharged into separator zone 49 against thrust plate 83 which serves to maintain the solids in zone 48 in substantially compact form. All or a portion of the conveyance fluid is removed therefrom via line 84 and the conveyed solids pass via transfer line 50 into the upper portion of selective adsorption column 11.

A circulation of solid granular adsorbent is hereby maintained successively through a high pressure adsorption zone and a vacuum stripping zone in which the sensitive more readily adsorbable constituents are adsorbed from a gaseous mixture on an adsorbent and subsequently stripped from the adsorbent in the vacuum stripping zone. If desired, a small degree of heat may be introduced into the rich adsorbent in bottom zone 37 of selective adsorption zone 11 or while the solids are being transferred through conveyance zone 41 to assist the vacuum desorption with ethylene oxide the degree of heating the adsorbent preferably does not exceed about 250° F.

Conveyance zone 48, depressuring and stripping zone 41, and sealing leg zone 43 are depicted as segmented conduits having successively larger diameters in the direction of fluid flow. The purpose of these sections of different diameter is to maintain the fluid velocity through the individual zones within predetermined limits so that the fluid pressure differential per unit length of lift line remains within fairly narrow limits. This permits in zones 41 and 48 the uniform application of lifting force to all portions of the solids contained therein and prevents the generation of appreciably higher lifting forces in the uppermost parts of each section than exist in the lower parts.

Preferably the solid adsorbent comprises activated charcoal although other well-known solid adsorbents such as activated aluminum oxide, silica gel, and the like may be employed in granules having a mesh size of from about 5 to 100 or higher, and preferably from about 10 to 40.

Referring now more particularly to Figure 2 a modification of separator zone 49 is shown in which lift line 90 introduces solids with a cocurrent lift gas flow into separator 91. The physical shape of the separator is that of a double cone with lift line 90 extending through the lower apex and opening into the upper cone adjacent its apex. No thrust plate is required and the granular solids flow downwardly through lift gas disengaging zone 92 situated in the general area corresponding to the coincident bases of the cones. At this point there is sufficient lifting fluid disengaging area on the granular solid surfaces formed from the solids discharging from depending tubes 93 so as to prevent the suspension of the solids in the fluid. The lifting fluid is removed via line 94 and the solids flow downwardly into the lower cone to be removed therefrom via transfer line 95. This modification of separator zone may replace, if desired, the separator zone 49 shown in Figure 1.

Referring now more particularly to Figure 3 another modification of separator zone is shown which is particularly well adapted to installations in which the separator zone is an integral part of the upper portion of a treating vessel. Thus vessel 100 is provided with separator zone 101 into which lift line 102 extends to open adjacent the upper extremity thereof. Thrust plate 103 is provided to maintain solids in line 102 in substantially compact form. The mass of solids 104 discharging from line 102 passes downwardly into vessel 100 while lifting fluid separated therefrom is removed via line 105. This modification of separator zone may also be installed in the apparatus illustrated in Figure 1.

Referring now more particularly to Figure 4 a modification of induction zone is shown which is adaptable to installation as an integral part of the lower portion of a treating vessel from which solids are to be removed. Vessel 110 is provided with a depending induction zone 111 into which lift line 112 opens at a point adjacent the lower extremity of the induction zone. If desired, the lower extremity of the lift line, as is true with the other induction zones 40 and 47 shown in Figure 1, may be restricted by a means not shown to between 0.1 and about 0.5 of the cross-sectional area of the lift line. Lifting fluid may be introduced via line 113 controlled by valve 114 or it may consist of fluid already present in vessel 110 and which is allowed to depressure cocurrently with the solids therefrom through lift line 112. The induction zone shown in Figure 4 may replace the induction zones shown in Figure 1.

Referring now more particularly to Figure 5, an elevation view of a vessel suitable for carrying out catalytic reactions and catalyst regeneration is shown. In vessel 120 solids are introduced via transfer line 121 to flow downwardly through regeneration zone 122 which is provided with cooling coils 123 to remove the heat of regeneration. Regeneration gases are introduced and removed via lines 124 and 125. The regenerated catalyst passes downwardly through sealing zone 126 ultimately into reaction zone 127. The hot solids are contacted by fluids to be treated, introduced and removed via lines 128 and 129. The spent solids collect in bottom zone 130 and are removed therefrom via transfer line 131. In this type of vessel catalytic reactions such as hydrocarbon cracking and reforming, carbon monoxide hydrogenation as well as other catalytic reactions may be carried out. Furthermore such reactions as thermal coking and cracking may be carried out in such a vessel. In most of these cases the solids following the reaction step are in a condition which requires some sort of purging or stripping which advantageously may be carried out at a decreased pressure from that existing in vessel 120. Further, the vessel shown in Figure 5 may bodily replace selective adsorption column 11 shown in Figure 1, the upper and lower portions of the vessel shown in Figure 5 being connected to transfer lines 50 and 38 respectively at points A—A and B—B. With such a combination the spent solids are depressured through a purging and stripping zone to a low pressure vessel wherein they may be further treated if desired and are subsequently returned through a sealing leg and another conveyance zone to the high pressure system shown in Figure 1.

The following data are given as examples of the process and apparatus of the present invention:

EXAMPLE I

An apparatus for selective adsorption of a gaseous mixture similar to that shown in Figure 1 was used for the recovery of ethylene oxide and ethylene from a gas produced from the catalytic oxidation of ethylene over a silver catalyst. This gaseous mixture was available at a rate of 141 MSCF (thousand standard cubic feet) per hour and had the following composition:

Table 1
FEED GAS COMPOSITION

| Component: | Per cent by volume |
|---|---|
| Nitrogen | 76.6 |
| Oxygen | 10.3 |
| Water vapor | 1.3 |
| Carbon dioxide | 6.2 |
| Ethylene | 2.0 |
| Ethylene oxide | 3.3 |
| | 99.7 |

The selective adsorption column employed to separate this gaseous mixture was 11.0 feet in diameter, 130 feet in height and was provided with a circulation of 37 tons per hour of activated coconut charcoal as the adsorbent. The feed gas was introduced into the adsorber at a pressure of 60 pounds per square inch gauge.

A lean gas product was produced at a rate of 126 MSCF per hour having the following composition:

Table 2
LEAN GAS COMPOSITION

| Component: | Per cent by volume |
|---|---|
| Nitrogen | 85.7 |
| Oxygen | 11.7 |
| Carbon dioxide | 2.6 |
| Ethylene | Trace |
| | 100.0 |

About 75 MSCF per hour of this was removed from the top of the vessel after having passed through the tubes of the cooler as a purge gas.

The first side cut gas product containing mostly carbon dioxide was produced from the second rectification zone at a rate of 5.5 MSCF per hour having the following composition:

Table 3
FIRST SIDE CUT GAS COMPOSITION

| Component: | Per cent by volume |
|---|---|
| Carbon dioxide | 96.4 |
| Ethylene | 3.5 |
| Ethylene oxide | 0.1 |
| | 100.0 |

A second side cut gas product was produced from the third rectification zone containing mostly ethylene at a rate of 2.9 MSCF per hour and had the following composition:

Table 4
SECOND SIDE CUT GAS COMPOSITION

| Component: | Per cent by volume |
|---|---|
| Carbon dioxide | 3.4 |
| Ethylene | 93.2 |
| Ethylene oxide | 3.4 |
| | 100.0 |

The ethylene oxide product was stripped from the charcoal by means of a portion of the lean gas passed as lift gas and sealing gas through zones 41 and 43 respectively. This product was produced at a rate of 4.7 MSCF per hour and had the following composition:

Table 5
ETHYLENE OXIDE PRODUCT COMPOSITION

| Component: | Per cent by volume |
|---|---|
| Ethylene | 2.2 |
| Ethylene oxide | 97.8 |
| | 100.0 |

In depressuring the rich charcoal through the first conveyance lift line, lean gas was depressured therethrough from a pressure of 60 pounds per square inch to a pressure of −13.5 pounds per square inch gauge maintained with the aid of a vacuum pump. The charcoal passed downwardly through sealing leg 43 countercurrent to sealing gas depressuring from five pounds per square inch gauge to −13.5 pounds per square inch gauge. The stripped charcoal was then repressured to the selective adsorption column through the main conveyance line 48 by means of a portion of the lean gas depressuring from 140 pounds per square inch gauge to the vessel pressure of 60 pounds per square inch gauge.

EXAMPLE II

In an operation similar to that described in Example I above, commercial propylene gas and air are reacted to produce a reactor effluent containing about 2.5% propylene oxide together with unreacted air, water vapor, carbon dioxide and unreacted propylene. This effluent is cooled to 100° F. and separated by the selective adsorption and low pressure stripping method described above. The rich adsorbent containing adsorbed propylene oxide is depressured through the conveyance-stripping zone at a temperature of about 130° F. to a pressure of −10 pounds per square inch gauge in the presence of a cocurrent flow of adsorbent lean gas consisting essentially of nitrogen and methane with a small amount of oxygen as the conveyance-stripping gas and is then passed downwardly through the sealing zone countercurrent to a flow of adsorber lean gas as a sealing gas. A substantially complete desorption of the adsorbed constituents is obtained at the low pressure and subsequent compression and cooling to 80° F. effects condensation of propylene oxide. The uncondensed gas is recirculated to the adsorption zone feed point and a side cut stream of propylene is recirculated to the reactor. In spite of the relatively high boiling point of propylene oxide and its reactivity, no adsorbent deterioration is noted when stripped as herein described in the absence of high stripping temperatures.

EXAMPLE III

In an adsorption process similar to that described above, a gaseous mixture produced in the thermal cracking of light petroleum naphthas and containing between 6 and 8% by volume of butadiene is contacted with a moving bed of activated charcoal at 100° F. and 40 pounds per square inch gauge. A lean gas stream consisting essentially of hydrogen is produced as the unadsorbed product and a side cut gas of 95% methane is also produced. The rich charcoal saturated with butadiene is depressured upwardly through the conveyance-stripping zone to a pressure of −10 pounds per square inch gauge cocurrently with a stream of methane and then passed downwardly through a sealing zone countercurrent to a methane sealing gas flow which depressures from about 18 pounds per square inch gauge to produce a lean adsorbent which is returned to the adsorption stage. The mixed methane-butadiene stream is compressed and cooled whereby the butadiene is condensed, separated and stored. A substantially complete butadiene recovery is effected without the use of heat and charcoal deactivation is avoided.

It is found possible to recover completely cyclopentadiene, acetylene and substituted acetylenes and other unsaturated thermally polymerizable hydrocarbon gases in this process.

EXAMPLE IV

In an apparatus similar to that described in connection with Figure 5, the catalytic cracking of 400° F. to 760° F. straight run gas oil was effected at a pressure of 25 pounds per square inch gauge, at a temperature which varied between 870° F. and 925° F. with an oil-to-catalyst ratio of 0.4 by volume in the presence of an acid-treated natural clay. The spent catalyst from the reactor was contaminated with 3.5% coke. This spent catalyst was depressured through a conveyance-stripping zone from 20 pounds per square inch gauge to −12 pounds per square inch gauge in the presence of a cocurrent flow of cracked dry gas consisting mainly of methane and hydrogen. A substantially complete removal of residual hydrocarbon contained on the hot spent catalyst was obtained. The stripped spent catalyst was subsequently passed from the vacuum chamber down through a sealing leg countercurrent to another flow of dry gas as a sealing fluid. The pressure at the bottom of the sealing leg was approximately atmospheric. The vacuum stripped catalyst was subsequently pressured through a lift line using hydrocarbon dry gas as a lifting medium depressuring from 55 pounds per square inch gauge to the reaction pressure of 20 pounds. The thus conveyed catalyst was then passed through the regeneration zone wherein the 3.5% coke was burned at a temperature of below 1050° F. leaving a hot regenerated catalyst to contact further quantities of the hydrocarbon feed. A 37% conversion to 400° F. end point gasoline was obtained. A jet ejector was used to maintain −10 pounds per square inch gauge pressure on the vacuum zone and a noticeably increased catalyst activity was maintained by virtue of the fact that steam was maintained to strip the catalyst.

It is to be understood that the foregoing examples are merely illustrative of the process and apparatus of the present invention and are not to be considered as limitations thereon. The method and equipment described for the treatment of moving masses of granular solids in systems involving two substantially different operating pressures are applicable to a wide variety of solids besides granular adsorbents and cracking catalysts shown in the examples. Furthermore, the particular adsorption example relating to the recovery of ethylene and ethylene oxide is also not to be considered as limiting the adsorption process combination since it is also applicable to the separation of other gaseous mixtures in which at least one of the constituents is highly soluble in water, reacts as water or water vapor, is corrosive in water or water vapor, or is thermally sensitive as are the easily polymerizable substances.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for the manufacture of an olefin oxide selected from the group consisting of ethylene oxide and propylene oxide from ethylene and propylene respectively which comprises establishing a reaction zone and a separation zone, introducing a reactant feed gas containing oxygen and an olefin hydrocarbon selected from the group consisting of ethylene and propylene into said reaction zone, maintaining pressure and temperature conditions therein favorable to the formation of the corresponding olefin oxide, removing an effluent gas therefrom containing said olefin oxide and unreacted hydrocarbon, passing said effluent gas into said separation zone, contacting said gas therein with a compact moving bed of solid granular adsorbent thereby adsorbing said olefin oxide forming a rich adsorbent and an unadsorbed gas containing less readily adsorbable gases, passing said rich adsorbent from said separation zone into a conveyance zone, maintaining said rich adsorbent in substantially compact form therein, moving said adsorbent therethrough with a cocurrent flow of a depressuring conveyance-stripping gas, discharging said adsorbent at least partially stripped into a low pressure zone, flowing said adsorbent subsequently by gravity through a sealing zone, passing a sealing gas countercurrent to said adsorbent therein, removing said sealing gas, said conveyance-stripping gas and stripped olefin oxide from said low pressure zone, and returning said adsorbent to said separation zone to contact further quantities of said effluent gas.

2. A process for the continuous manufacture of propylene oxide which comprises establishing a reaction zone and a separation zone, introducing propylene and an oxygen-containing gas into said reaction zone, maintaining pressure and temperature conditions therein favorable to the formation of propylene oxide, removing an effluent gas therefrom containing propylene oxide, unreacted propylene, and unreacted oxygen, passing said effluent gas into said separation zone, contacting said gas therein with a compact moving bed of solid granular adsorbent thereby adsorbing said propylene oxide forming a rich adsorbent and a substantially unadsorbed gas containing less readily adsorbable gases, passing said rich adsorbent from said separation zone into a conveyance zone, maintaining said rich adsorbent in substantially compact form therein, moving said adsorbent therethrough with a cocurrent flow of a depressuring conveyance-stripping gas, discharging said adsorbent at least partially stripped into a low pressure zone, flowing said adsorbent subsequently by gravity through a sealing zone, passing a sealing gas countercurrent to said adsorbent therein, removing said sealing gas, said conveyance-stripping gas and stripped propylene oxide from said low pressure zone, and returning said adsorbent to said separation zone to contact further quantities of said effluent gas.

3. A process for the continuous manufacture of ethylene oxide which comprises establishing a reaction zone and a separation zone, introducing ethylene and an oxygen-containing gas into said reaction zone, maintaining pressure and temperature conditions therein favorable to the formation of ethylene oxide, removing an effluent gas therefrom containing ethylene oxide, unreacted ethylene, and unreacted oxygen, passing said effluent gas into said separation zone, contacting said gas therein with a compact moving bed of solid granular adsorbent thereby adsorbing said ethylene oxide forming a rich adsorbent and a substantially unadsorbed gas containing less readily adsorbable gases, passing said rich adsorbent from said separation zone into a conveyance zone, maintaining said rich adsorbent in substantially compact form therein, moving said adsorbent therethrough with a cocurrent flow of a depressuring conveyance-stripping gas, discharging said adsorbent at least partially stripped into a low pressure zone, flowing said adsorbent subsequently by gravity through a sealing zone, passing a sealing gas countercurrent to said adsorbent therein, removing said sealing gas, said conveyance-stripping gas and stripped ethylene oxide from said low pressure zone, and returning said adsorbent to said separation zone to contact further quantities of said effluent gas.

4. A process according to claim 3 wherein said separation zone is provided with two rectification zones, said rich adsorbent is contacted in one rectification zone with an ethylene-containing reflux gas to desorb less readily adsorbable constituents, said adsorbent is subsequently contacted in the other rectification zone with an ethylene oxide-containing reflux gas to desorb ethylene, and combining the thus desorbed ethylene with ethylene introduced into said reaction zone.

5. A process according to claim 4 wherein said sealing gas and said conveyance-stripping gas comprise a portion of said substantially unadsorbed gas.

6. A process according to claim 5 wherein the gases removed from said low pressure zone are compressed and cooled thereby condensing ethylene oxide, and a portion of said ethylene oxide is vaporized and returned to said separation zone as reflux therein.

7. A process according to claim 6 wherein the pressure maintained in said low pressure zone is subatmospheric.

8. A process according to claim 3 wherein said adsorbent is selected from the group consisting of activated charcoal, activated aluminum oxide and silica gel.

9. A process according to claim 3 wherein said conveyance-stripping gas and said sealing gas comprise a gas containing ethylene.

10. A process according to claim 3 wherein the gases removed from said low pressure zone are compressed and cooled thereby condensing ethylene oxide, a first part of said ethylene oxide is vaporized, one portion of the vapor is returned to said separation zone as reflux, the remaining portion of the vapor is employed as said conveyance-stripping gas and the second part of ethylene oxide is produced as a product.

11. A process according to claim 3 wherein said effluent gas also contains nitrogen, carbon monoxide, and carbon dioxide, said substantially unadsorbed gas contains said carbon monoxide, nitrogen, and oxygen, said carbon dioxide is produced as a first side cut gas and said unreacted ethylene is produced as a second side cut gas.

12. A process according to claim 3 wherein the reaction of ethylene to produce ethylene oxide is catalyzed by a silver catalyst.

13. A process according to claim 12 wherein the reaction temperature is maintained between about 350° F. and 750° F.

14. A process according to claim 5 in combination with the steps of compressing and cooling the ethylene oxide-bearing gas removed from said low pressure zone and recycling the uncondensed conveyance-stripping and sealing gas to said separation zone to recover residual amounts of ethylene oxide therefrom.

No references cited.